April 3, 1962 H. PHILLIPS ETAL 3,027,989
CONVEYOR LOADING MECHANISMS
Original Filed Nov. 12, 1959 4 Sheets-Sheet 2
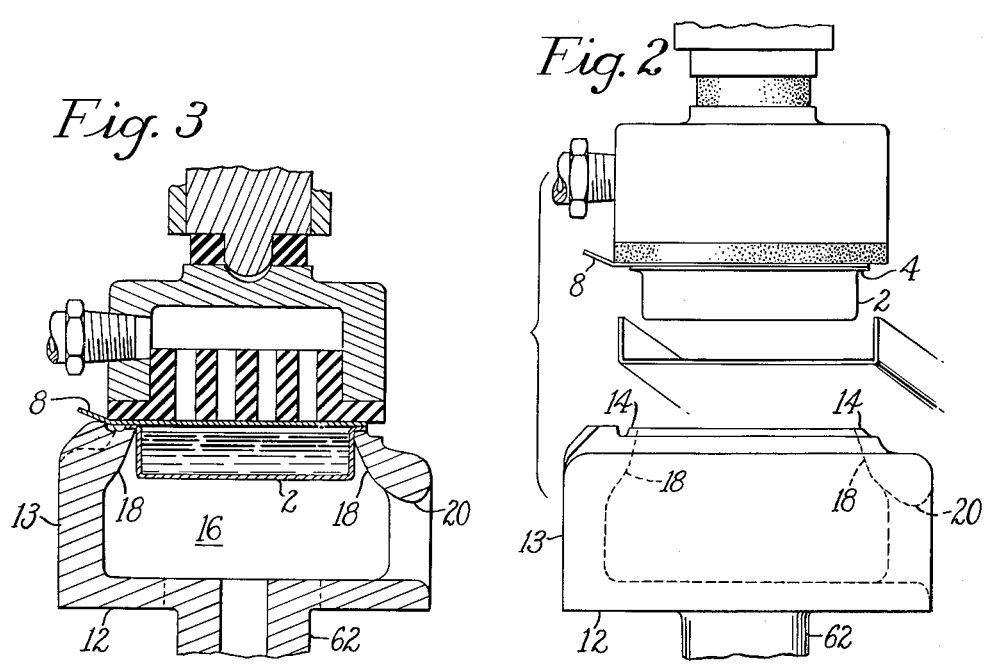
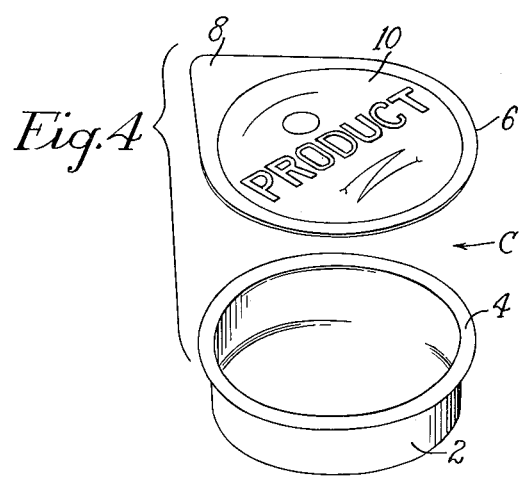

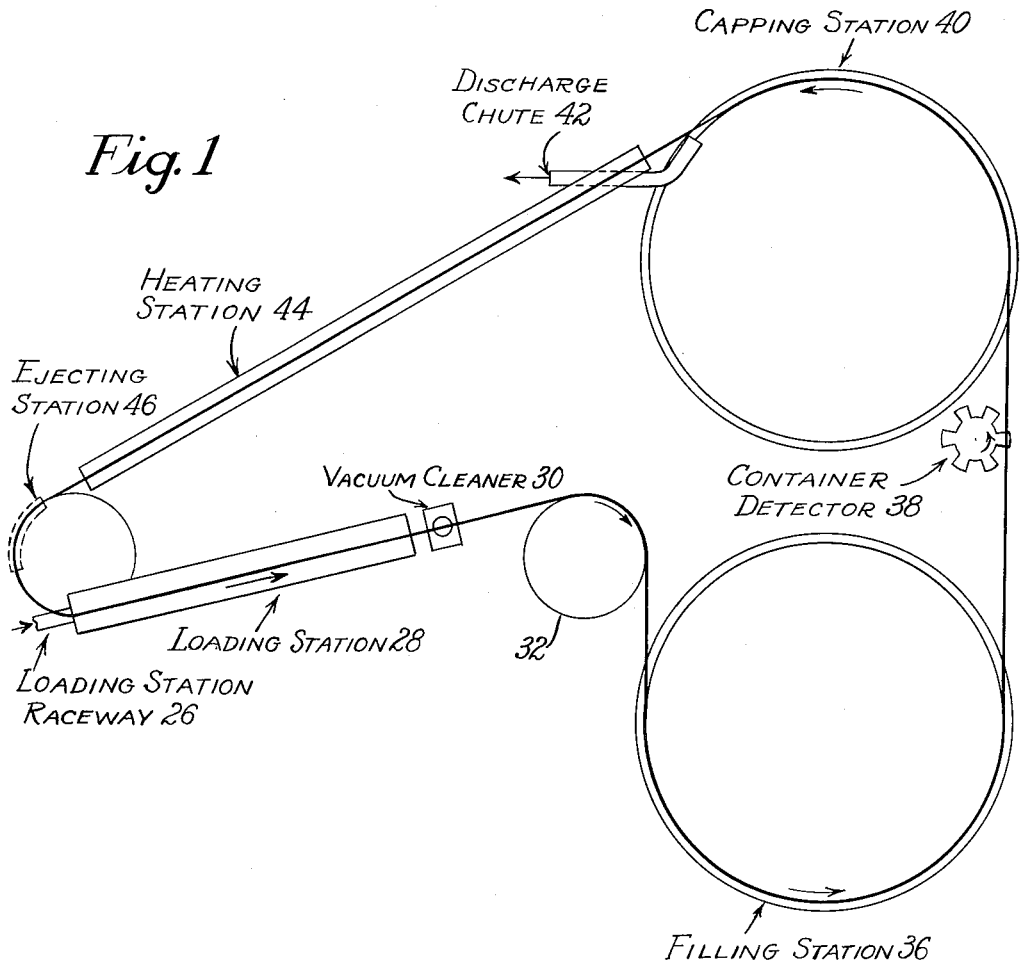

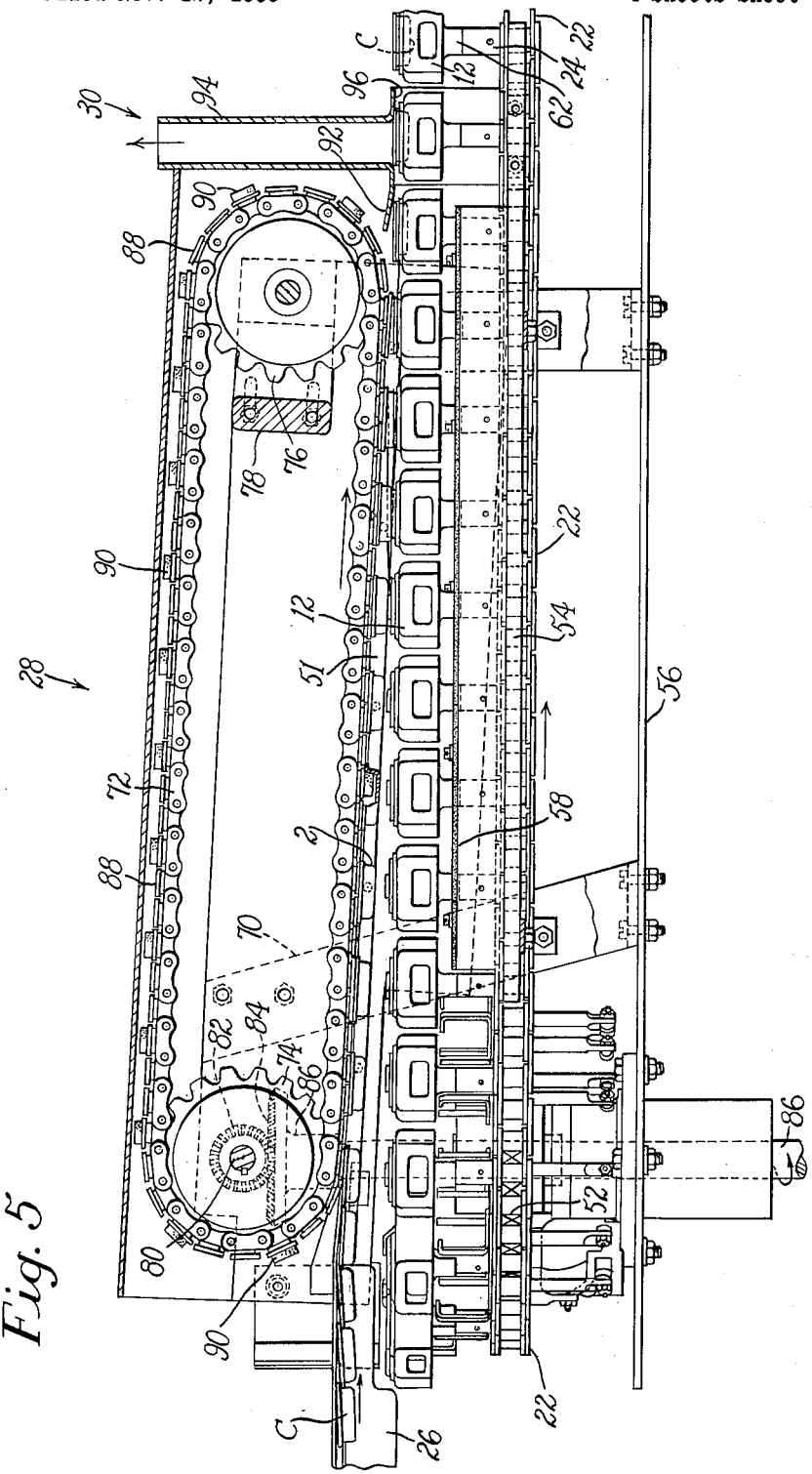

April 3, 1962 H. PHILLIPS ETAL 3,027,989
CONVEYOR LOADING MECHANISMS
Original Filed Nov. 12, 1959 4 Sheets-Sheet 4
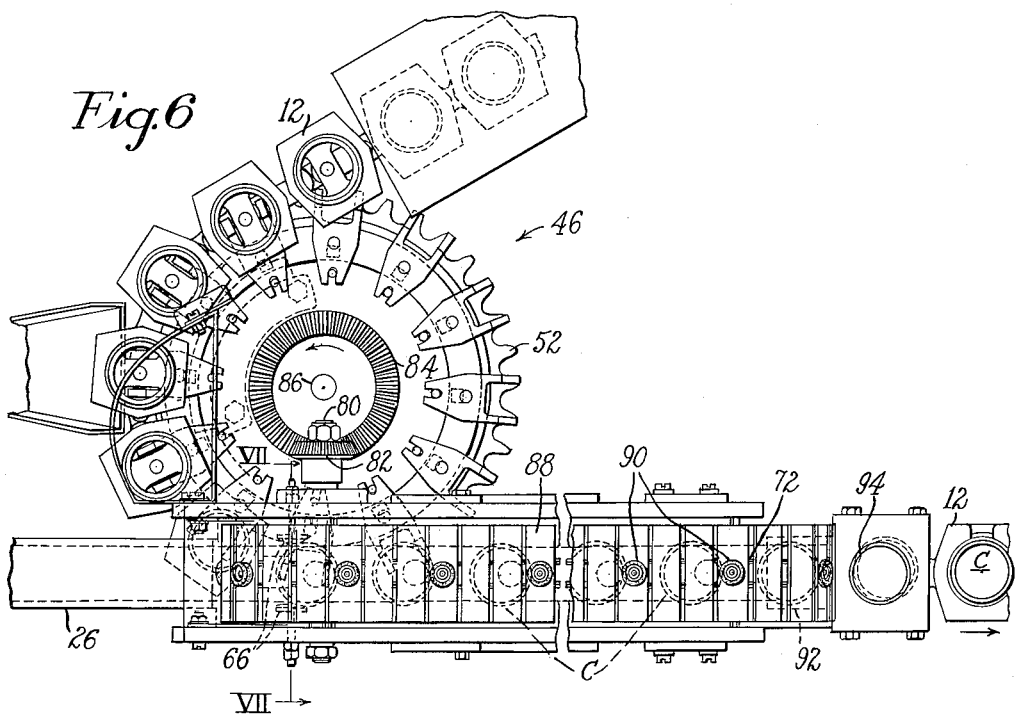
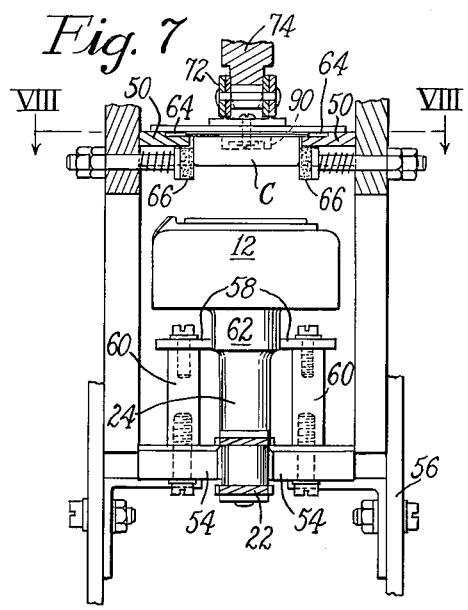
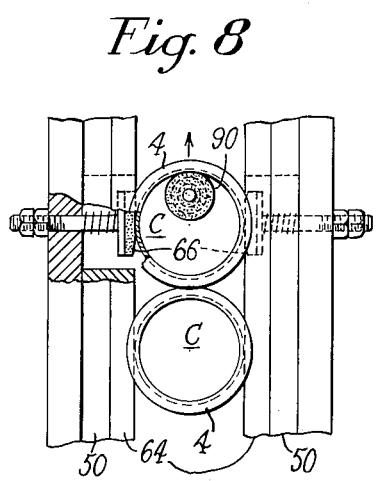

3,027,989
CONVEYOR LOADING MECHANISMS
Harry Phillips, Hamilton, and John J. Maciejowski, Wenham, Mass., assignors, by mesne assignments, to Ekco-Alcoa Containers, Inc., Wheeling, Ill., a corporation of Illinois
Original application Nov. 12, 1959, Ser. No. 852,526. Divided and this application Jan. 16, 1961, Ser. No. 83,055
10 Claims. (Cl. 198—20)

This invention relates generally to packaging and more particularly to machinery for filling and sealing containers. The invention in its broader aspects is embodied in a machine for automatically depositing a unit portion of a product in a container and hermetically sealing it without human hands touching the container or its product.

The invention is illustrated herein as apparatus for loading empty containers in an automatic packaging machine and constitutes a division of our copending application Serial No. 852,526, filed November 12, 1959.

The use of a disposable container holding a small quantity of a product which is to be consumed without the container subsequently being resealed presents a definite advantage over conventional packaging methods in the matters of convenience of handling and distribution when the protection afforded by the container to its contents permits lengthy storage before use. For example, food products, such as jams, syrups, condiments, etc., packaged in quantities representing single servings or portions, in receptacles known as unit containers, are becoming increasingly more popular in restaurants, railroads, airlines, and the like. Since these containers most often are distributed directly to their ultimate consumers for immediate use they must be easily opened without the aid of tools, such as a conventional can opener.

In the past, unit containers have been made of flexible plastic material. However, a major disadvantage of a container made of this type of material is that it is susceptible to penetration by air, and accordingly its contents, if perishable, may spoil in a relatively short time. To overcome this and therefore provide a longer shelf life, unit containers are now being made of lightweight metals, such as aluminum, which, when hermetically sealed by plastic fusion with a cover of like material, afford protection to their contents for a considerably longer time and furthermore can be opened without the use of tools. Since the advantage of the system of unit portion distribution is predicted economically upon high quantity production, it is mandatory that reliable, relatively high speed machinery, either automatic or semi-automatic, be employed in the production and handling of unit containers.

An object of this invention is to provide a machine for loading containers automatically in a conveyor of a filling and sealing machine.

While unit containers may be used to package any product they are extremely useful as receptacles for foodstuffs and an obvious advantage resides in the use of machinery which is capable of filling containers with food and completely capping and sealing the containers without the necessity of their ever being touched by human hands.

Accordingly, it is another object of this invention to provide a machine for automatically loading unit containers in a filling and sealing machine in a continuous and automatic process without the containers or their contents ever being touched.

While there may be numerous sizes and shapes, a typical unit container is a shallow, cylindrical, cup-like receptacle fabricated preferably of aluminum and having a flange extending radially around the open end. The interior of the cup and the upper surface of the flange are coated with a thermoplastic material, such as vinyl. An aluminum cap or cover which may be provided with a label if desired, and having a similar coating is hermetically sealed to the upper surface of the flange through fusing of the vinyl coatings on the mating surfaces of the flange and the cover.

In accordance with the above objects and as a feature of this invention there is provided a loading or feeding machine comprising an endless conveyor mounting a plurality of carriers for transporting unit containers one at a time successively from a loading station to a filling station and a capping station. The conveyor carriers serve a plurality of purposes and each comprises a substantially hollow body having an open top which is defined by an annular supporting lip upon which the flange of the unit container rests with the body portion of the container extending into the hollow interior.

Containers are loaded into the carriers at the loading station comprising this invention and which includes a second conveyor for moving the containers downwardly of an inclined raceway at the same linear speed as the carriers and spaced apart the same distance as the carriers are spaced on the main conveyor. By this mechanism each container is gradually settled into a carrier and upon leaving the raceway its flange is pressed into firm engagement with the carrier by a pressure applying member which is also provided with means for cleaning the container by vacuum. From the loading station the containers pass around a rotary filling machine thence to a multihead capping station which, per se, form no part of this invention. Thereafter, the container is removed from the carrier and deposited in a chute which conveys it to distributing mechanism which likewise, per se, does not form a part of the present invention.

The above and other features of the invention, including various novel details of construction and combinations of parts will now be more particularly described with reference to the accompanying drawings and pointed out in the claims. It will be understood that the particular machine embodying the invention is shown by way of illustration only and not as a limitation of the invention. The principles and features of this invention may be employed in numerous embodiments without departing from the scope of the invention.

In the drawings,

FIG. 1 is a schematic plan view of the various work stations of a machine embodying the invention for automatically filling and sealing unit containers;

FIG. 2 is a side elevation of portions of a container carrier and a cap applying head;

FIG. 3 is a sectional view, of portions of the apparatus shown in FIG. 2 with the cap applying head in sealing position;

FIG. 4 is a perspective view of a unit container with its cap removed;

FIG. 5 is a side elevation of the apparatus for loading unfilled unit containers into the carriers;

FIG. 6 is a plan view of an ejector mechanism for removing unit containers from their carriers as well as a plan view of the loading apparatus shown in FIG. 5;

FIG. 7 is a sectional view taken on the line VII—VII of FIG. 6; and

FIG. 8 is a plan view, partly in section, taken on the line VIII—VIII of FIG. 7.

Referring first to FIG. 4, a unit container C will be seen comprising a cylindrical, cup-shaped body portion 2 which is made of aluminum and has a radially extending flange 4 around its open end. The interior of the body or cup, as it may also be called, as well as the upper surface of the flange 4, is coated with thermoplastic material, such as polyvinyl chloride. The coating on the flange may, as an alternative, be entirely pressure sensitive or both heat and pressure sensitive. A complete container includes an aluminum cap or cover 6 having substantially the same diameter as the flange 4 and a pull tab portion 8. A label 10 may be located on the upper surface, and on its lower surface the cap has a coating of heat and/or pressure sensitive material, similar to that on the flange. The cap is hermetically sealed to the upper surface of the flange 4 through fusing of the vinyl coatings or adhering of the pressure sensitive material after the container has been filled.

A plurality of container carriers 12, also called stools (FIGS. 2 and 3), are constructed and arranged to carry unit containers one at a time through all of the work stations of the machine. In essence, each carrier comprises a substantially hollow body 13 provided at its upper end with an annular supporting member in the form of a lip 14 defining the opening in the top. The interior of the carrier comprises an opening of larger diameter than that of the unit container body 2 whereby the unit container may be received in the carrier with its body 2 extending downwardly into the hollow interior 16, the undersurface of its annular flange 4 being supported on the annular lip 14.

Each of the carriers has an opening 20 in the side wall below the open top in order to provide a passageway for a beam of light which serves to detect the absence of a container in a manner to be described in detail hereinafter. The opening 20 also serves to permit removal of any material, which inadvertently enters the interior 16 of the carrier, more readily than through the top.

A plurality of carriers 12 are secured to an endless chain conveyor 22 in upright position each by means of a depending stem 24 fitted into a link of the chain, as seen in FIG. 7. The carriers 12 and the chain 22 form the nucleus of a conveyor system which cooperatively interconnects all of the work stations of the machine. Referring to FIG. 1, which is a schematic diagram of the conveyor and work stations, there will be seen at the extreme left-hand portion, a loading station raceway 26 providing for conducting preformed unit container bodies 2 to the machine. These bodies 2 may be supplied from a continuously operating forming press or from a supply of previously formed and stored containers. The raceway 26 directs the bodies 2 to a loading station 28 which automatically positions one container body in each carrier 12. From here the then loaded carrier is conducted to a pressing and vacuum cleaning device 30 which removes from the container by vacuum any contaminating material, such as metallic chips, dirt and the like, which may inadvertently have entered the container. Thence, the containers pass to the filling and capping portion of the machine which do not form a part of the present invention and are herein described only briefly. The carriers pass around an idler sprocket 32 which is provided with means for ascertaining whether or not a container is positioned in each carrier. If a container is not properly located in a carrier, appropriate safety devices (not shown) are actuated to prevent the carrier from being filled. The carriers next pass around a rotary filling station 36 whereupon they receive their contents. The filling station may comprise either single or multihead mechanism for filling either one or a plurality of containers simultaneously. From the filling station 36, the carriers with the then filled containers pass a second detector 38 which ascertains again whether or not a filled container is in each carrier and, if not, actuates appropriate safety mechanism for rendering inoperative the particular capping mechanism which would otherwise cap the container. The carriers and their filled containers next pass around a rotary capping station 40 whereupon a cap is positioned on each of the filled containers and hermetically sealed to its flange. After sealing has taken place, the filled and capped containers are removed automatically from the capping mechanism and deposited in a discharge chute 42 which conveys them away from the machine to appropriate packaging apparatus.

After the filled and capped containers have been removed from the carriers 12, the conveyor 22, to which the carriers are permanently attached, passes through a heating station 44 which heats the bodies of the carriers 12. It is the residual heat in the mass of the carrier body which is conducted to the flange of the container by the annular lip 14 to effect hermetic sealing of the cap at the capping station. From the heating station 44 the conveyor passes around an ejecting station 46 which serves to remove from the carriers any container which was not removed at the discharge end of the capping station 40. From this point the carriers re-enter the loading station 28 to receive another container and carry it through another cycle.

The loading station embodying the invention will now be described referring particularly to FIGS. 5 to 8. The containers enter the machine from the loading station raceway 26 and pass onto a pair of spaced guide plates 50. The guide plates are located directly above the path of movement of the conveyor chain 22. After passing around a sprocket wheel 52, which is part of the ejecting station 46 (FIGS. 1 and 6), the conveyor chain moves in a straight path, being guided by a pair of chain guides 54 secured to the frame 56 of the loading station. As best seen in FIG. 7, the carriers 12, which extend upwardly from the chain 22 on their stems 24, likewise are guided by a pair of elongated carrier guides 58 which extend lengthwise of the machine and are supported on a pair of upstanding support members 60 secured to the chain guides 54. The elongated carrier guides 58 are made of self-lubricated material, such as nylon, Teflon or the like, and engage a hub 62 formed on the carrier stem 24. Thus, it will be seen in FIGS. 5 and 7 that the carriers are precisely guided along a predetermined linear path, each with its uppermost surface, as defined by the lip 14, in a horizontal plane.

Each container guide plate 50 is provided with a groove 64 (FIG. 7) to accommodate the flanges 4 of the unit containers. The guide plates 50 form a downwardly inclined container guideway 51 by being mounted in the machine so that they gradually descend from left to right, as viewed in FIG. 5, toward the path of the carriers. Shortly after they reach the guide plates 50 from the raceway 26 the movement of each container C is interrupted by a pair of spring-pressed yieldable stop members 66 (FIGS. 7 and 8) which are adjustably secured in the frame of the machine.

Mounted directly above the guideway 51 on brackets 70 is a second conveyor 72 in the form of an endless chain. The left-hand end of the chain passes around a driving sprocket 74 and the right-hand end around an idler sprocket 76 adjustably mounted on the machine by a movable bracket 78. The driving sprocket 74 is keyed to a shaft 80 (FIG. 5) and is driven through gears 82, 84 by a shaft 86 which mounts the sprocket wheel 52 of the ejecting station 46. The driving chain 72 is provided with flat "table top" links 88. Located on every third link is a lug 90 in the form of a disk of rubber, nylon or other resilient material. The linear distance between the lugs 90 is exactly equal to the linear distance between adjacent carriers 12 on the conveyor chain 22. The linear speed of the conveyor chain 72 likewise is equal to the linear speed of the main conveyor 22. The purpose of the lugs 90, is to cause entry of the containers into the carriers. As each unit container C proceeds from the raceway 26 to the guideway 51, its movement is retarded by the spring-biased stop members 66 until it is engaged by one of the lugs 90 whereupon it is moved out of engagement with the stop members and down the inclined guideway 51, as seen in FIG. 5. The lugs 90 are located on the chain 72 so that the leading edge of every lug is directly over the leading edge of the interior opening of the corresponding carrier 12. As the lug conducts the container downwardly of the inclined guideway 51, it gradually approaches the carrier and as it nears the lowermost end of the guideway 51, it begins to settle into the carrier. This will be seen taking place at the right-hand end of FIG. 5. By the time the containers C reach the idler sprocket 76 they have settled into the carriers with their flanges 4 resting upon the supporting lips 14 of the carriers and, as the conveyor chain 72 passes around the idler sprocket 76 the lugs 90 are withdrawn from the carriers, the containers being propelled entirely then by the carriers.

After becoming disengaged from the lugs 90 each of the carriers 12, which is then carrying an empty container, passes through the vacuum cleaning and pressing station 30 comprising a resilient presser member 92 which urges every container into firm contact with its carrier 12. Adjacent the presser member 92 is a conduit 94 which is connected to a source of vacuum. The diameter of the conduit 94 is slightly less than the outer diameter of the flange 4 of a container so that the lower surface 96 of the conduit which engages the flange 4 will prevent the container from being withdrawn from the carrier by the vacuum. However, any chip, dirt or other foreign material which may inadvertently have entered into the container is removed therefrom.

After the containers C have been loaded, one to each carrier, and are vacuum cleaned they are conducted to the filling station 36 by passing around the idler sprocket 32 and proceed through the machine in the above described manner.

Having thus described our invention, what we claim as new and desire to secure by Letters Patent of the United States is:

1. In a machine for filling and capping containers, means for transporting containers to a plurality of work stations comprising an endless conveyor mounting a plurality of container carriers, each carrier comprising an open-top, recessed body, means for moving each carrier on the conveyor successively along a predetermined path, and second conveyor means for moving each container at a selected speed along a path overlying and gradually inclining toward said predetermined path to maintain registry between each container and its recessed carrier for settling one container gradually into each recessed carrier.

2. In a machine for filling and capping containers, means for transporting containers to a plurality of work stations comprising an endless conveyor mounting a plurality of container carriers, each carrier comprising an open-top, recessed body, means for moving each carrier on the conveyor successively along a predetermined path, a container guideway positioned above and inclined toward the path of movement of the carriers, and a second conveyor for moving containers at a selected speed along the guideway to maintain registry between each container and its carrier for settling one container gradually into each recessed carrier.

3. In a machine for filling and capping containers, means for transporting containers to a plurality of work stations comprising an endless conveyor mounting a plurality of container carriers, each carrier comprising an open-top, recessed body, means for moving each carrier on the conveyor successively along a predetermined path, a container guideway positioned above and inclined downwardly toward the path of movement of the carriers, a second conveyor for moving the containers downwardly of the guideway toward the moving carriers, and means for moving both conveyors at the same linear speed, whereby one container is gradually settled into each carrier.

4. In a machine for filling and capping containers, means for transporting containers to a plurality of work stations comprising an endless conveyor mounting a plurality of container carriers, each carrier comprising an open-top, recessed body, means for moving each carrier on the conveyor successively along a predetermined path, a container guideway positioned above and inclined downwardly toward the path of movement of the carriers, a second conveyor for moving the containers downwardly of the guideway toward the moving carriers, a plurality of lugs uniformly spaced on the second conveyor the same distance apart as the carriers are spaced on the first conveyor, each lug being engageable with a container, and means for moving both conveyors at the same linear speed, whereby one container is moved by a lug and gradually settled into a carrier.

5. In a machine for filling and capping containers, means for transporting containers to a plurality of work stations comprising an endless conveyor mounting a plurality of container carriers, each carrier comprising an open-top, recessed body, means for moving each carrier on the conveyor successively along a predetermined path, a container guideway positioned above and inclined toward the path of movement of the carriers, a second conveyor for moving the containers along the guideway toward the moving carriers, and a plurality of presser members on the second conveyor engageable with the upper surface of the containers for gradually forcing the containers into the moving recessed carriers.

6. In a machine for filling and capping containers, means for transporting containers to a plurality of work stations comprising an endless conveyor mounting a plurality of container carriers, each carrier comprising an open-top, recessed body, means for moving each carrier on the conveyor successively along a predetermined path, a container guideway positioned above and inclined downwardly toward the path of movement of the carriers, a second conveyor for moving the containers downwardly of the guideway toward the moving carriers, a plurality of presser members on the second conveyor engageable with the upper surface of the containers, a plurality of lugs associated with the presser members and uniformly spaced on the second conveyor the same distance apart as the carriers are spaced on the first conveyor, and means for moving both conveyors at the same linear speed, whereby the presser members and the lugs gradually settle one container into each moving carrier.

7. In a machine for filling and capping containers, means for transporting containers to a plurality of work stations comprising an endless conveyor mounting a plurality of container carriers, each carrier comprising an open-top, recessed body, means for moving each carrier on the conveyor successively along a predetermined path, a container guideway positioned above and inclined downwardly toward the path of movement of the carriers, a second conveyor for moving the containers downwardly of the guideway toward the moving carriers, and means for moving both conveyors at the same linear speed, whereby one container is gradually settled into each moving carrier, and presser means located at the terminal end of the second conveyor and engageable with the container carried by each carrier to urge the container downwardly into complete engagement with the carrier after it leaves the second conveyor.

8. In a machine for filling and capping containers, means for transporting containers to a plurality of work stations comprising an endless conveyor mounting a plurality of container carriers, each carrier comprising an open-top, recessed body, means for moving each carrier on the conveyor successively along a predetermined path, a container guideway positioned above and inclined downwardly toward the path of movement of the carriers, a second conveyor for moving the containers downwardly of the guideways toward the moving carriers, and means for moving both conveyors at the same linear speed whereby one container is gradually settled into each moving carrier, presser means located at the terminal end of the second conveyor and engageable with the container carried by each carrier to urge the container downwardly into complete engagement with the carrier after it leaves the second conveyor, and vacuum cleaning means associated with the presser means for removing foreign matters from the containers after they have been loaded into their carriers.

9. In a machine for filling and capping containers, means for transporting containers to a plurality of work stations comprising an endless conveyor mounting a plurality of container carriers, each carrier comprising an open-top, recessed body, means for moving each carrier mounted on the conveyor successively along a predetermined path, a container guideway positioned above and inclined downwardly toward the path of movement of the carriers, a second conveyor for moving the containers downwardly of the guideway toward the moving carriers, means for delivering containers to the guideway, yieldable spring means to stop each container as it reaches the guideway, a plurality of lugs uniformly spaced on the second conveyor the same distance apart as the carriers are spaced on the first conveyor, and means for moving both conveyors at the same linear speed with the lugs in predetermined vertical alignment with the carriers, whereby each container is engaged by a lug and removed from the spring means and gradually settled into its associated carrier.

10. In a machine for filling and capping containers, means for transporting containers to a plurality of work stations comprising an endless conveyor mounting a plurality of container carriers, each carrier comprising an open-top, recessed body, means for moving each carrier on the conveyor successively along a predetermined path, a container guideway positioned above and inclined relatively toward the path of movement of the carriers, a second conveyor for moving the containers along the guideway toward the moving carriers, and means for moving both conveyors at corresponding linear speeds whereby one container is gradually settled into each carrier.

References Cited in the file of this patent

UNITED STATES PATENTS

| | | |
|---|---|---|
| 724,588 | Koneman | Apr. 7, 1903 |
| 2,896,943 | Lewi | July 28, 1959 |